United States Patent [19]

Goss

[11] Patent Number: 4,604,311

[45] Date of Patent: Aug. 5, 1986

[54] PRECOAT RESIN DISPERSION FOR TUFTED CARPETS

[75] Inventor: Raymond W. Goss, New Castle County, Del.

[73] Assignee: Hercules Incorporated, Wilmington, Del.

[21] Appl. No.: 749,593

[22] Filed: Jun. 27, 1985

Related U.S. Application Data

[62] Division of Ser. No. 627,705, Jul. 3, 1984.

[51] Int. Cl.⁴ .................... B32B 3/02; B32B 33/00
[52] U.S. Cl. ................................. 428/96; 428/95; 428/97
[58] Field of Search .................... 428/96, 95, 97

[56] References Cited

U.S. PATENT DOCUMENTS 3,338,858  8/1967  Strasser ........................... 260/29.7
4,552,794  11/1985  Goss ................................. 428/96

*Primary Examiner*—Marion C. McCamish
*Attorney, Agent, or Firm*—Joanne L. Horn

[57] ABSTRACT

Disclosed is a precoat resin dispersion having a solids content from about 63% to about 69% comprising (1) at least one resin having a Ring and Ball softening point from about 60° C. to about 100° C. in an aqueous dispersion having a solids content from about 53% to about 58%; (2) at least one water-soluble polymer; (3) at least one cationic resin; and (4) water. The precoat resin dispersion is useful in the manufacture of tufted carpets, especially carpets manufactured with carboxylated latices as a backcoat.

18 Claims, No Drawings

PRECOAT RESIN DISPERSION FOR TUFTED CARPETS

This application is a division of application Ser. No. 627,705, filed 7/3/84.

This invention relates to chemical compositions. Particularly, this invention relates to novel precoat resin dispersions useful in the manufacture of tufted textile articles, such as, tufted carpets.

Tufted textile articles are made by inserting a plurality of vertical, reciprocating needles threaded with yarn into a moving primary backing fabric to form tufts of yarn. Loopers or hooks, which work in a timed relationship with the stroke of the needles, are located below the primary backing so that the loopers are positioned just above the needle eye when the needles are at the lowest point in their downward stroke. When the needles reach the lowest point in the downward stroke, the yarn is picked up from the needles by the loopers and held momentarily. Loops or tufts of yarn are formed as the needles are drawn back through the backing fabric. This process is repeated when the previously formed loops are moved away from the loopers as the backing fabric is advanced.

The loops can be cut during the tufting process to form a cut pile as opposed to a loop pile construction. If a cut pile is desired, a looper and knife combination is used in the tufting process.

Additional information on the manufacture of tufted articles may be found in Rose, Stanley H., "Tufted Materials", Man-Made Textile Encyclopedia, Chap. IX, Textile Book Publishers, Inc., (1959).

When the tufted article is a carpet, the primary backing fabric is typically a woven or nonwoven fabric made of one or more of natural and synthetic fibers, such as jute, wool, rayon, polyamides, polyesters, polypropylene and polyethylene, or of films of synthetic materials, such as polypropylene, polyethylene, and copolymers thereof.

The tufts of yarn inserted during the tufting process are usually held in place by the untwisting action of the yarn in combination with the shrinkage of the backing fabric. However, when the article is a tufted carpet, the back of the backing fabric may be coated with a backcoat material, such as a latex or emulsion of natural or synthetic rubbers or synthetic resins, or a hot melt adhesive, to assist in locking or anchoring the tufts to the backing material, to improve the dimensional stability of the tufted carpet, to make the carpet more durable and to provide skid and slip resistance.

Generally, the tufted carpet is further stabilized by laminating a secondary backing, such as jute, woven or nonwoven fabrics made from polypropylene, polyethylene, and copolymers thereof, to the tufted carpet.

Carpets bonded with a synthetic rubber or synthetic resin latex generally do not employ precoat compositions, such as precoat resin dispersions, in their manufacture. When precoat compositions are used, they are applied to the backside of the primary backing in an amount sufficient to penetrate the individual tufts of yarn thereby increasing the resistance of the tufts to pull-out, known as tuft-bond strength or pile-bond strength, and enhancing the bonding of the primary backing fabric to the backcoating material. The amount of precoat necessary to penetrate the individual tufts will vary depending on the carpet yarn density and the efficacy of the precoat.

Up until this point, the use of a latex, wherein the resin has a multiplicity of carboxyl groups, such as a carboxylated styrene-butadiene latex, together with a cationic resin as the crosslinking agent, particularly polyamide-epichlorohydrin resins, have failed for one reason or another. Basically the mixtures of carboxylated latices and cationic resin have such a low shelf life that the mixture partially or completely crosslinks in its shipping container before it can even be brought into close proximity to let alone actual contact with, the tufts on the backside of the tufted primary backing.

A precoat resin dispersion has now been found which improves the tuft-bond strength, narrows the statistical variation of tuft bond values and increases the stiffness and durability of carpets backcoated with carboxylated rubber latices. The precoat resin dispersion of this invention allows the cationic resin crosslinking agent to penetrate to tufts on the backside of the tufted primary backing prior to the coating and penetration of the same tufts with a carboxylated latex. Hence, the precoat resin dispersion of this invention when applied as a precoat in the manufacture of tufted carpets eliminates the opportunity for any premature crosslinking between the cationic resin crosslinking agent and the carboxylated latex, i.e. any crosslinking other than at the site of the tuft on the backside of the primary backing fabric.

According to the present invention, a precoat resin dispersion having a solids content from about 63% to about 69% is provided comprising by weight (1) from about 93% to about 99% of a resin in an aqueous dispersion having from about 53% to about 58% solids content; (2) from about 0.5% to about 5%, based on the total water content of (1), of a water-soluble polymer; (3) from about 0.1% to about 2% of a cationic resin, based on the total solids content of (1); and (4) optionally, sufficient water so that the solids content of the precoat resin dispersion is from about 63% to about 69%. Preferably the precoat resin dispersion of this invention has a solids content from about 64% to about 67% and comprises from about 94% to 97% of component (1) with the solids content of component (1) being from about 54% to 56%; from 1.5% to about 2.5% of component (2); and from about 0.5 to 1.5% of component (3).

Any conventional method for preparing resin dispersions may be used to prepare the aqueous resin dispersion of component (1). Suitable methods are taught in U.S. Pat. No. 3,582,464. Typically, when component (1) is a rosin-type resin, an aqueous solution of potassium hydroxide is added to a molten resin in an amount sufficient to provide, by weight, from about 1% to 8% potassium resinate. Water, optionally containing an emulsifying agent, is then added in an amount sufficient to provide, by inversion, an oil-in-water type emulsion having a solids content from about 53% to about 58%. When component (1) is a hydrocarbon-type resin, an aqueous solution of potassium hydroxide is added to a molten resin admixed with 1% to about 6% of a rosin or rosin ester in an amount sufficient to provide, by weight, from about 1% to about 6% potassium resinate. Water is then added in an amount sufficient to provide, by inversion, an oil-in-water type emulsion having a solids content from about 53% to about 58%.

The precoat resin dispersion is particularly useful in the manufacture of carpets wherein carboxylated styrene-butadiene latices are used to coat the tufted primary backing fabric prior to lamination with the secondary backing fabrics. Generally the carboxylated styrene-butadiene latices contain up to 700 parts per hundred of a mineral filler.

All parts and percentages used in this disclosure and in the claims are by weight unless otherwise specified.

Component (1) of the precoat resin dispersion of this invention is at least one resin having a Ring and Ball softening point from about 60° C. to about 100° C. in an aqueous dispersion of 53% to about 58% solids. Suitable resins include hydrocarbon resins prepared by polymerizing the component mixture of a blend of a five carbon stream and a nine carbon stream from petroleum refining, commonly referred to as a $C_5$-$C_9$ stream. Hence, the resins prepared from such a stream are commonly referred to as $C_5$-$C_9$ resins. The components of a $C_5$-$C_9$ stream are unsaturated aliphatic and vinyl aromatic hydrocarbon compounds, both normal and branched, in which the number of carbons generally does not exceed nine. Other suitable resins include hydrocarbon resins prepared by polymerizing the monomer mixture of a five carbon component stream, known as a $C_5$ stream, from petroleum refining, the monomers being primarily unsaturated aliphatic. The resins prepared from a $C_5$ stream are commonly referred to as $C_5$ resins. The primary monomers present in a $C_5$ stream are di- and mono-olefins, both normal and branched, having five carbons and mono-olefins having six carbons. The preferred hydrocarbon resin is the $C_5$ resin.

In addition, polyterpene resins derived from alpha-pinene, beta-pinene, and monocyclic terpenes such as dipentene; and esters of rosin, such as the methyl ester of rosin, the methyl ester of hydrogenated rosin, the triethylene glycol ester of rosin, the triethylene glycol ester of hydrogenated rosin, the diethylene glycol ester of rosin, the diethylene glycol ester of hydrogenated rosin, the ethylene glycol ester of rosin and the ethylene glycol ester of hydrogenated rosin, the glycerol ester of rosin and the pentaerythritol ester of rosin can be used. The preferred ester of rosin is the glycerol ester of resin.

Component (2) of the precoat resin dispersion of this invention is at least one water-soluble polymer having a molecular weight from about 100 to about 10,000. Suitable polymers include polyacrylates, such as polysodium acrylate, and cellulose derivatives, such as carboxymethylcellulose, methylcellulose, hydroxyethylcellulose, hydroxypropylcellulose, methylhydroxyethylcellulose, methylhydroxypropylcellulose, carboxymethylhydroxyethylcellulose, hydroxypropylhydroxyethylcellulose, and hydrophobically modified hydroxyethylcellulose. Usually component (2) is added to component (1) as an aqueous dispersion of from about 4% to about 7% solids.

Component (3) of the precoat resin dispersion of this invention is at least one cationic resin having a RVF Brookfield viscosity at 25° C. of from about 50 centipoise (cps) to about 325 cps, preferably from about 50 cps to about 100 cps. Preferably, the cationic resin is a polyamide-epichlorohydrin resin. The polyamide-epichlorohydrin resin can be prepared by reacting a saturated aliphatic dicarboxylic acid with a polyalkylene amine to form a linear polyamide, and then reacting the polyamide with epichlorohydrin. Suitable methods of preparation are set forth in U.S. Pat. Nos. 2,926,154 and 3,966,654. Typical polyamides include copolymers of adipic acid and diethylenetriamine or adipic acid with diethylenetriamine and ethylenediamine. Polyamide as used herein includes copolymers and terpolymers. Generally component (3) is added as an aqueous dispersion of from about 3% to about 7% solids.

In addition, small amounts of conventional additives, such as antioxidants, surfactants, flocculants, fillers and the like can be included in the precoat resin dispersions.

The following examples illustrate various aspects of this invention. They are not intended to limit the invention. Modifications of the specific precoat resin dispersions, carpets prepared with the precoat resin dispersions and procedures of these examples can be made without departing from the spirit and scope of this invention.

EXAMPLE 1

This example illustrates a preferred specific embodiment of the precoat resin dispersion of this invention, and how to prepare it.

A mixing container affixed with a stirrer is charged with 92.5 g of the glycerol ester of a 50% hydrogenated rosin having a Ring and Ball softening point of 80° C. in an aqueous dispersion, the total solids content of the aqueous dispersion being approximately 55% and prepared as set forth herein above. Stirring is continued throughout all additions until a precoat resin dispersion of this invention is formed. Two (2)%, based on the total water of the aqueous dispersion containing the resin, of a polysodium acrylate, also in a dispersion which is diluted with water to a 5.7% solids content, is added to the first aqueous dispersion, followed by the addition of 1% of an (adipic acid-diethylenetriamine) polyamide-epichlorohydrin resin having a viscosity of 50 cps at 25° C. in a yet another aqueous dispersion diluted with water to a 5.0% solids content, thereby providing a precoat resin dispersion of this invention.

EXAMPLE 2

This example illustrates another specific embodiment of the precoat resin dispersion this invention. The precoat resin dispersion is prepared according to the formulation and procedure of Example 1 except that a 65% hydrogenated glycerol ester of rosin having a Ring and Ball softening point of 82° C. is used instead of the 50% hydrogenated glycerol ester of rosin.

EXAMPLE 3

This example illustrates another embodiment of this invention. The precoat resin dispersion is prepared according to the formulation and procedure of Example 1 except that an aliphatic hydrocarbon resin having a Ring and Ball softening point of 85° C. is used instead of the glycerol ester of a 50% hydrogenated rosin.

EXAMPLE 4

This example illustrates another embodiment of this invention. The precoat resin dispersion is prepared according to the formulation and procedure of Example 1 except that an aromatic hydrocarbon resin having a Ring and Ball softening point of 95° C. is used instead of the glycerol ester of a 50% hydrogenated rosin.

EXAMPLE 5

This example illustrates another embodiment of this invention. The precoat resin dispersion is prepared according to the formulation and procedure of Example 1 except that a 65% hydrogenated pentaerythritol ester of rosin having a Ring and Ball softening point of 82° C. is used instead of the 50% hydrogenated rosin, except that 0.5% of the polysodium acrylate is used instead of 2%, and except that a polyamide-epichlorohydrin resin having a RVF Brookfield viscosity of 325 cps at 25° C., where the polyamide is terpolymer of adipic acid, diethylenetriamine, and ethylenediamine, is used instead of one having a viscosity of 50 cps at 25° C.

EXAMPLE 6

This example illustrates another embodiment of this invention. The precoat dispersion is prepared according to the procedure of Example 1 using the formulation of Example 2 except that 0.5% of the polysodium acrylate is used instead of 2%, and except that a polyamide-epichlorohydrin resin having a RVF Brookfield viscosity of 85 cps at 25° C., where the polyamide is terpolymer of adipic acid, diethylenetriamine, and ethylenediamine, is used instead of one having a viscosity of 50 cps at 25° C.

EXAMPLE 7

This example illustrates another embodiment of this invention. The precoat resin dispersion is prepared according to the procedure of Example 1 using the formulation of Example 2 except that 3% of a hydroxyethylcellulose is used instead of 2% of a polysodium acrylate dispersion.

EXAMPLE 8

This example illustrates another embodiment of this invention. The precoat resin dispersion is prepared according to the procedure of Example 1 using the formulation of Example 2 except that 1% of a hydroxyethylcellulose is used instead of 2% of a polysodium acrylate dispersion.

EXAMPLE 9

This example illustrates another embodiment of this invention. The precoat resin dispersion is prepared according to the procedure of Example 1 using the formulation of Example 2 except that 2% of a hydroxyethylcellulose is used instead of 2% of a polysodium acrylate dispersion.

EXAMPLE 10

This example illustrates another embodiment of this invention. The precoat resin dispersion is prepared according to the procedure of Example 1 using the formulation of Example 2 except that 1% of a sodium salt of carboxymethylcellulose (CMC) is used instead of 2% of a polysodium acrylate dispersion.

EXAMPLE 11

This example illustrates another embodiment of this invention. The precoat resin dispersion is prepared according to the procedure of Example 1 using the formulation of Example 2 except that 3% of a CMC is used instead of 2% of a polysodium acrylate dispersion.

EXAMPLE 12

This example illustrates another embodiment of this invention. The precoat resin dispersion is prepared according to the procedure of Example 1 using the formulation of Example 2 except that 2% of a CMC is used instead of 2% of a polysodium acrylate dispersion.

EXAMPLE 13

This example shows the tuft bond strength of finished carpets prepared with the precoat resin dispersion of this invention and a carboxylated styrene-butadiene rubber latex as the backcoat.

Carpet specimens are prepared according to the procedures of ANSI/ASTM D1335-67 using 10 oz./yd.$^2$ of the precoat resin dispersion of Example 1 as the precoat and then applying 24 oz./yd.$^2$ of the carboxylated styrene-butadiene rubber latex as the backcoat and, as the control, a carpet specimen prepared in the same manner without the precoat, but backcoated with 24 oz./yd.$^2$ of the carboxylated styrene-butadiene rubber latex. The carpet test specimens are mounted and tested for tuft bond strength according to ANSI/ASTM D1335-67. Basically, this test measures the amount of force required to separate individual pile yarns from the carpet. The tuft bond strength of the control carpet test specimen is 12–16 lbs.; whereas the carpet test specimen with the precoat resin dispersion of this invention is 22–26 lbs.

Other features, advantages and specific embodiments of this invention will become apparent to those exercising ordinary skill in the art after reading the foregoing disclosures. Such specific embodiments are within the scope of this invention. Moreover, while specific embodiments of the invention have been described in considerable detail, it is not limited thereto, and variations and modifications of those embodiments can be effected without departing from the spirit and scope of the invention.

What I claim and desire to secure by Letter Patent is:
1. A carpet comprising:
   (a) a primary backing fabric stitched with loops of yarn on the frontside of the primary backing fabric to form a tufted structure;
   (b) a precoat resin dispersion coated on the backside of the primary backing fabric having a solids content from about 63% to about 69% containing
      (i) from about 93% to about 99% by weight of at least one resin material selected from the group consisting of hydrocarbon resins prepared from petroleum refined streams, polyterpene resins and esters of rosin having a Ring and Ball softening point of from about 60° C., to about 100° C. in an aqueous dispersion having a solids content from about 53% to about 58%;
      (ii) from about 0.5% to about 5%, by weight of the total water content of (i), of at least one water-soluble polymer selected from the group consisting of polyacrylates and cellulose derivatives;
      (iii) from about 0.1% to about 2.0% of at least one cationic polyamide-epichlorohydrin resin, by weight of the total solids of (i); and
      (iv) optionally, sufficient water so that the solids content of the precoat resin dispersion is from about 63% to about 69%; and
   (c) a carboxylated styrene-butadiene latex applied over the precoat resin dispersion.

2. The precoat resin dispersion of claim 1 wherein (b)(i) is a hydrocarbon resin prepared from petroleum refined streams selected from the group consisting of $C_5-C_9$ hydrocarbon resins and $C_5$ hydrocarbon resins.

3. The precoat resin dispersion of claim 2 wherein (b)(i) is a $C_5-C_9$ hydrocarbon resin.

4. The precoat resin dispersion of claim 2 wherein (b)(i) is a $C_5$ hydrocarbon resin.

5. The precoat resin dispersion of claim 1 wherein (b)(i) is an ester of rosin.

6. The precoat resin dispersion of claim 1 wherein (b)(ii) is a polysodium acrylate.

7. The precoat resin dispersion of claim 1 wherein (b)(ii) is a cellulose derivative.

8. The precoat resin dispersion of claim 7 wherein the cellulose derivative is selected from the group consisting of carboxymethylcellulose, methylcellulose, hydroxyethylcellulose, hydroxypropylcellulose, methylhydroxyethylcellulose, methylhydroxypropylcellulose, carboxymethylhydroxyethylcellulose, hydroxypropylhydroxyethylcellulose, and hydrophobically modified hydroxyethylcellulose.

9. The precoat resin dispersion of claim 1 wherein (b) (iii) has a viscosity at 25° C. of from about 50 cps to about 325 cps.

10. A carpet comprising:
(a) a primary backing fabric stitched with loops of yarn on the frontside of the primary backing fabric to form a tufted structure;
(b) a precoat resin dispersion coated on the backside of the primary backing fabric having a solids content from about 64% to about 67% containing
  (i) from about 94% to about 97% by weight of at least one resin material selected from the group consisting of hydrocarbon resins prepared from petroleum refined streams, polyterpene resins and esters of rosin having a Ring and Ball softening point of from about 60° C. to about 100° C. in an aqueous dispersion having a solids content from about 54% to about 56%;
  (ii) from about 1.5% to about 2.5%, by weight of the total water content of (i), of at least one water-soluble polymer selected from the group consisting of polyacrylates and cellulose derivatives;
  (iii) from about 0.5% to about 1.5% of at least one cationic polyamide-epichlorohydrin resin, by weight of the total solids of (i); and
  (iv) optionally, sufficient water so that the solids content of the precoat resin dispersion is from about 64% to about 67%; and
(c) a carboxylated styrene-butadiene latex applied over the precoat resin dispersion.

11. The precoat resin dispersion of claim 10 wherein (b) (i) is a hydrocarbon resin prepared from petroleum refined streams selected from the group consisting of $C_5$–$C_9$ hydrocarbon resins and $C_5$ hydrocarbon resins.

12. The precoat resin dispersion of claim 11 wherein (b) (i) is a $C_5$–$C_9$ hydrocarbon resin.

13. The precoat resin dispersion of claim 11 wherein (b) (i) is a $C_5$ hydrocarbon resin.

14. The precoat resin dispersion of claim 10 wherein (b) (i) is an ester of rosin.

15. The precoat resin dispersion of claim 10 wherein (b) (ii) is a polysodium acrylate.

16. The precoat resin dispersion of claim 10 wherein (b) (ii) is a cellulose derivative.

17. The precoat resin dispersion of claim 16 wherein the cellulose derivative is selected from the group consisting of carboxymethylcellulose, methylcellulose, hydroxyethylcellulose, hydroxypropylcellulose, methylhydroxyethylcellulose, methylhydroxypropylcellulose, carboxymethylhydroxyethylcellulose, hydroxypropylhydroxyethylcellulose, and hydrophobically modified hydroxyethylcellulose.

18. The precoat resin dispersion of claim 10 wherein (b) (iii) has a viscosity at 25° C. of from about 50 cps to about 325 cps.

* * * * *